(12) United States Patent
Coates

(10) Patent No.: US 11,015,405 B2
(45) Date of Patent: May 25, 2021

(54) SAND AND GAS SEPARATION APPARATUS AND METHOD THEREOF

(71) Applicant: DHI—DALBO HOLDINGS, INC. & SUBSIDIARIES, Salt Lake City, UT (US)

(72) Inventor: Gary Coates, Salt Lake City, UT (US)

(73) Assignee: DHI—DALBO HOLDINGS, INC. & SUBSIDIARIES, Salt Lake City, UT (US)

( * ) Notice: Subject to any disclaimer, the term of this patent is extended or adjusted under 35 U.S.C. 154(b) by 448 days.

(21) Appl. No.: 15/909,444

(22) Filed: Mar. 1, 2018

(65) Prior Publication Data

US 2019/0271200 A1   Sep. 5, 2019

(51) Int. Cl.
| | | |
|---|---|---|
| *E21B 21/06* | (2006.01) | |
| *B01D 19/00* | (2006.01) | |
| *B01D 21/24* | (2006.01) | |
| *B01D 17/02* | (2006.01) | |
| *E21B 43/34* | (2006.01) | |
| *B01D 21/02* | (2006.01) | |

(52) U.S. Cl.
CPC ........... *E21B 21/067* (2013.01); *B01D 17/02* (2013.01); *B01D 17/0214* (2013.01); *B01D 19/0021* (2013.01); *B01D 19/0042* (2013.01); *B01D 21/02* (2013.01); *B01D 21/2455* (2013.01); *E21B 21/065* (2013.01); *E21B 43/34* (2013.01); *C02F 2201/008* (2013.01)

(58) Field of Classification Search
None
See application file for complete search history.

(56) References Cited

U.S. PATENT DOCUMENTS

| | | | | | |
|---|---|---|---|---|---|
| 3,616,599 | A | * | 11/1971 | Burnham, Sr. ........ | E21B 21/067 95/248 |
| 3,895,927 | A | * | 7/1975 | Bournham, Sr. ...... | E21B 21/067 96/163 |
| 4,116,639 | A | * | 9/1978 | Fross ...................... | C09C 1/487 23/314 |
| 4,130,481 | A | * | 12/1978 | Chase .................... | C02F 3/1221 210/603 |
| 4,155,724 | A | * | 5/1979 | Burnham, Sr. ........ | E21B 21/067 96/196 |
| 4,353,719 | A | * | 10/1982 | Kennedy, Jr. ............. | B04C 5/24 96/167 |
| 4,655,804 | A | * | 4/1987 | Kercheval ............ | B01D 50/002 55/324 |
| 4,707,277 | A | * | 11/1987 | Mims ................... | B01D 21/245 210/241 |

(Continued)

*Primary Examiner* — Christopher P Jones
*Assistant Examiner* — Phillip Y Shao
(74) *Attorney, Agent, or Firm* — Oliff PLC

(57) ABSTRACT

A separation apparatus for separating constituents from effluent. The separation apparatus includes a gas diffuser, a hopper, and a tank. The gas diffuser includes an inlet inner tube for receiving effluent from a well. The hopper is disposed at least partially below the gas diffuser, and the tank is connected to the hopper. The gas diffuser is configured so that gas in the effluent is released from the effluent and into the atmosphere before the effluent enters the hopper. The hopper is configured so that liquid effluent in the hopper spills over a top portion of the hopper and into the tank.

12 Claims, 7 Drawing Sheets

(56) References Cited

U.S. PATENT DOCUMENTS

| | | | |
|---|---|---|---|
| 6,553,901 B2 * | 4/2003 | Reddoch | B30B 9/12 100/106 |
| 8,636,402 B2 * | 1/2014 | Medoff | C12M 41/48 366/163.2 |
| 9,901,864 B2 * | 2/2018 | De Godos Crespo | C02F 11/04 |
| 2007/0075024 A1 * | 4/2007 | Campbell | B01D 21/02 210/802 |
| 2013/0186622 A1 * | 7/2013 | Thompson | E21B 43/34 166/267 |
| 2018/0347334 A1 * | 12/2018 | Martin | B01D 21/2422 |

* cited by examiner

SAND AND GAS SEPARATION APPARATUS AND METHOD THEREOF

BACKGROUND

The petroleum industry commonly uses "frac sand" to produce petroleum fluids such as oils, natural gas, and natural gas liquids. In a typical hydraulic fracturing process ("fracking"), a well is drilled into a rock and water is pumped into the well. The water is typically treated with chemicals in order to enhance the water's ability to carry grains of frac sand in suspension. Large pumps are then used to increase the water pressure in the well until the pressure is so high that it exceeds the breaking point of the surrounding rock causing fractures. As a result, the treated water gushes rapidly into the fractures. Thus, sand grains are carried with the water deep into the fractures.

The large pumps are then turned off, but the fractures remain partially open due to the sand grains. Thus, the frac sand supports the fractures so that the fractures do not completely deflate. The fractures, supported by the sand grains, form a network of pores that allow petroleum oil to flow out of the drilled rocks and into the well. The oil is then pumped out of the rocks. However, frac sand is contained within the oil, along with water and gas.

SUMMARY

Exemplary embodiments of the broad inventive principle perspectives described herein provide an apparatus to separate the frac sand, water, and gas from the pumped oil. The apparatus includes a gas diffuser with an inlet inner tube to receive effluent from a well. Additionally, the apparatus includes a hopper and a tank. The hopper is disposed at least partially below the gas diffuser. Gas in the effluent is released from the effluent and into the atmosphere before the effluent enters the hopper. Liquid in the effluent spills over a top portion of the hopper and into the tank.

The exemplary embodiments provide a method of separating constituents form the effluent. The method includes introducing effluent from a well into a gas diffuser, and directing the effluent from the gas diffuser and into a hopper such that gas in the effluent is released into the atmosphere and that solids and liquid in the effluent fall into the hopper. The method also includes removing the solid effluent from the hopper, and providing a tank such that the liquid effluent spills over from the hopper and enters the tank.

DETAILED DESCRIPTION OF EXEMPLARY EMBODIMENTS

Figure 1:
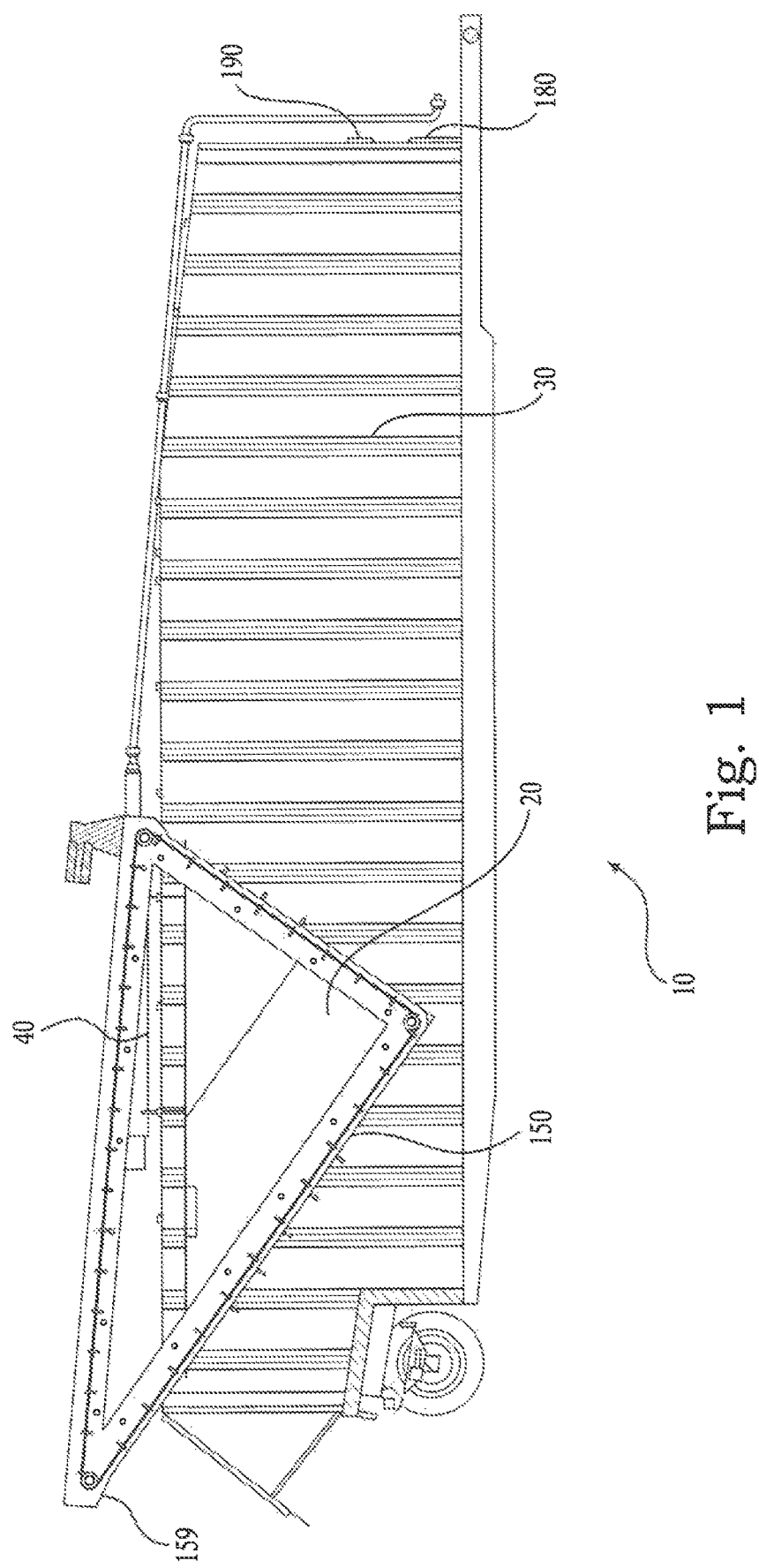
FIG. 1 is a diagrammatic illustration of an exemplary separation apparatus.

FIG. 1 illustrates an exemplary separation apparatus 10 that includes a hopper 20, a tank 30, and a gas diffuser 40. Separation apparatus 10 receives effluent from a newly drilled well. The effluent is typically a slurry containing pumped oil along with an undesirable mixture of sand, water, and other hydrocarbons (in a liquid or gaseous state). As discussed further below, the effluent enters separation apparatus 10 through gas diffuser 40. The effluent is then directed into hopper 20, where the solids, including the sand, are removed. The oil and water spills over the top of hopper 20 and moves into tank 30. Once within tank 30, the oil and water mixture is able to separate so that the oil and water may be separately extracted from tank 30.

As shown in FIGS. 1-4, hopper 20 is disposed at least partially within tank 30, and gas diffuser 40 is disposed at least partially over hopper 20. An outer exterior of tank 30 may include stairs, rails, and pathways that allow easy access for a user to a variety of locations on separation apparatus 10. Such may enable a user to easily repair components on separation apparatus 10. Additionally, separation apparatus 10 may include wheels so that separation apparatus 10 may be transported to various locations.

Figure 5:
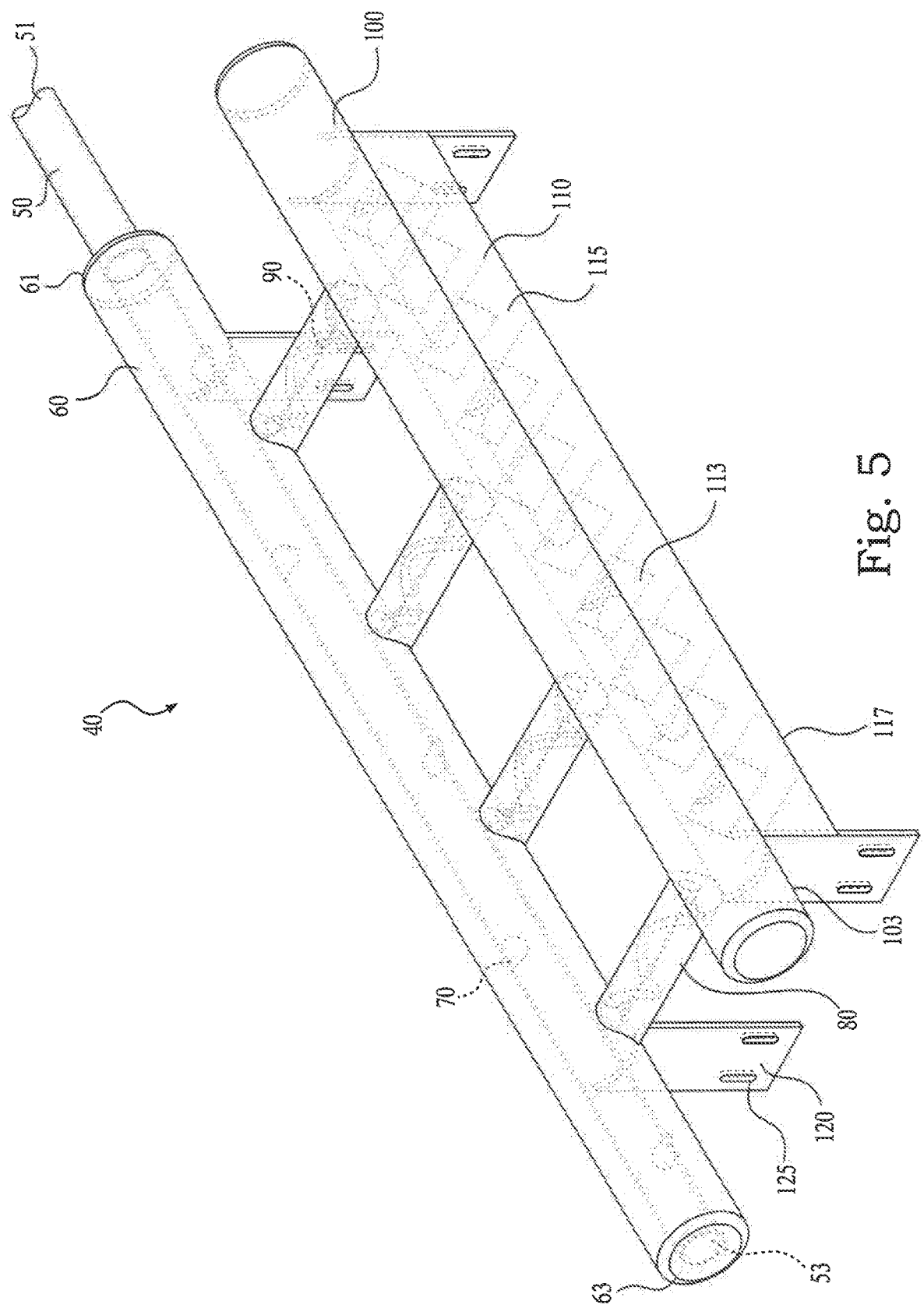
FIG. 5 is an enlarged view illustrating a gas diffuser of the separation apparatus of FIGS. 1-4.

An exemplary gas diffuser 40 is illustrated in FIG. 5. Gas diffuser 40 may include an inner inlet tube 50 and an outer tube 60. Inner inlet tube 50 may have a first end 51 and a second end 53. First end 51 may be connected to the well (not shown). Second end 53 may be a closed end. Inner inlet tube 50 may form a channel from first end 51 to second end. Outer tube 60 may also include a first end 61 and a second end 63. First end 61 may include an aperture that is sized for inlet inner tube 50 to be disposed there through. Second end 63 may be a closed end. Outer tube 60 may form a channel from first end 61 to second end 63 that is sealed from the outside environment.

Effluent from the well may flow into inlet inner tube 50. The effluent may include a mixture of oil, gas, water, and/or sand. As shown in FIG. 5, outer tube 60 is disposed radially outward of at least a portion of inlet inner tube 50. Additionally, inlet inner tube 50 may include one or more holes 70 that each forms a continuous opening from an inner surface of inlet inner tube 50 to an outer surface of inlet inner tube 50. Thus, effluent flowing within and through inlet inner tube 50 also flows within and through outer tube 60. Holes 70 may be of sufficient size so that holes 70 calm down the rush of the effluent flowing through inlet inner tube 50. Thus, holes 70 may slow the speed of the effluent. Furthermore, holes 70 may be disposed on inlet inner tube 50 at regular intervals, or holes 70 may be disposed on inlet inner tube 50 at random locations. Effluent flowing within and through inlet inner tube 50 may flow through holes 70 and into one or more intermediate tubes 80. As shown in FIG. 5, while the effluent flows through holes 70 and into intermediate tubes 80, the effluent is maintained within outer tube 60. Thus, outer tube 60 provides a barrier from the outside environment.

Outer tube 60 may be connected to intermediate tubes 80 such that outer tube 60 and intermediate tubes 80 form a continuous inner channel. Cyclones 90 may be disposed within intermediate tubes 80 to affect a settling rate of the effluent. Cyclones 90 may include any conventional and well-known cyclones that are sufficient to further slow the speed of the effluent. Additionally, cyclones 90 may enhance particle separation in the effluent.

Gas diffuser 40 may further include a diffuser shell 100. As shown in FIG. 5, diffuser shell 100 may be a tubular component that forms a continuous inner channel with intermediate tubes 80 (and, thus, with outer tube 60). A bottom surface 103 of diffuser shell 100 may be connected to a skirt 110. The connection between diffuser shell 100 and skirt 110 may be continuous such that bottom surface 103 is directly connected to skirt 110. Thus, the connection between bottom surface 103 and skirt 110 may be closed to the outside environment. Alternatively, skirt 110 may be separated from bottom surface 103 so that a gap is formed between skirt 110 and bottom surface 103.

Skirt 110 may include one or more baffles 113 disposed interior of sidewalls 115. Baffles 113 may direct slowed effluent flowing out of intermediate tubes downward through skirt 110. In some embodiments, baffles 113 are stationary components that do not move relative to sidewalls 115 of skirt 110. In other embodiments, baffles 113 are movable components that pivot relative to sidewalls 115 in order to direct the effluent downward through skirt 110. It is further contemplated that baffles 113 may include a mixture of stationary and moveable baffles.

Once the effluent enters diffuser shell 100, the effluent is directed through bottom surface 103 of diffuser shell 100 and into skirt 110. Baffles 113 then direct the effluent (including the oil, water, sand and/or slurry) downward and into hopper 20. A bottom surface 117 of skirt 110 may be open to the outside environment. Therefore, bottom surface 117 of skirt 110 forms a gap with hopper 20. Such a gap allows the gas in the effluent to flow into the outside atmosphere and diffuse into the atmosphere. Therefore, the gas does not flow into hopper 20.

In the embodiments where skirt 110 is separated from bottom surface 103 of diffuser shell 100, the gas in the effluent may also flow into the outside environment as the effluent flows downward into baffles 103. Thus, in these embodiments, the gas in the effluent may flow into the outside environment when the effluent flows into skirt 110 from diffuser shell 100 and when the effluent flows from skirt 110 and into hopper 20.

As also shown in FIG. 5, gas diffuser 40 may include end walls 120 with slots 125. End walls 120 may connect to hopper 20 and/or tank 30 so that gas diffuser 40 is vertically separated from hopper 20. Such may provide the gap between skirt 110 and hopper 20. Slots 125 may connect to closure mechanisms on hopper 20 and/or tank 30 in order to secure the components together.

Because gas diffuser 40 allows the gas in the effluent to diffuse from skirt 110 and into the outside atmosphere, gas diffuser 40 allows the safe release of gas without requiring the use of blasting effects. Furthermore, gas diffuser 40 allows the gas in the effluent to be removed before the effluent enters hopper 20. Thus, gas diffuser 40 prevents/reduces the occurrence of flammable gas in hopper 20 and/or tank 30, which may be hazardous. Additionally, gas diffuser 40 allows the entire amount of the gas in the effluent (or substantially the entire amount) to be removed from the effluent. Gas diffuser 40 also allows the effluent traveling therethrough to be slowed in speed, in order to efficiently separate the components of the effluents.

Once the effluent (including the oil, water, sand and/or slurry) is directed from baffles 113 and into hopper 20, the effluent joins the liquid/solid mixture already present in hopper 20. At this stage, the gas in the effluent has previously been released to the outside atmosphere. During normal working conditions, hopper 20 may be full and flooded so that the liquid effluent (water and oil) may spill over from hopper 20 and flow into tank 30. Solids (sand and slurry) in the effluent may fall to a bottom portion of hopper 20.

Figure 6:
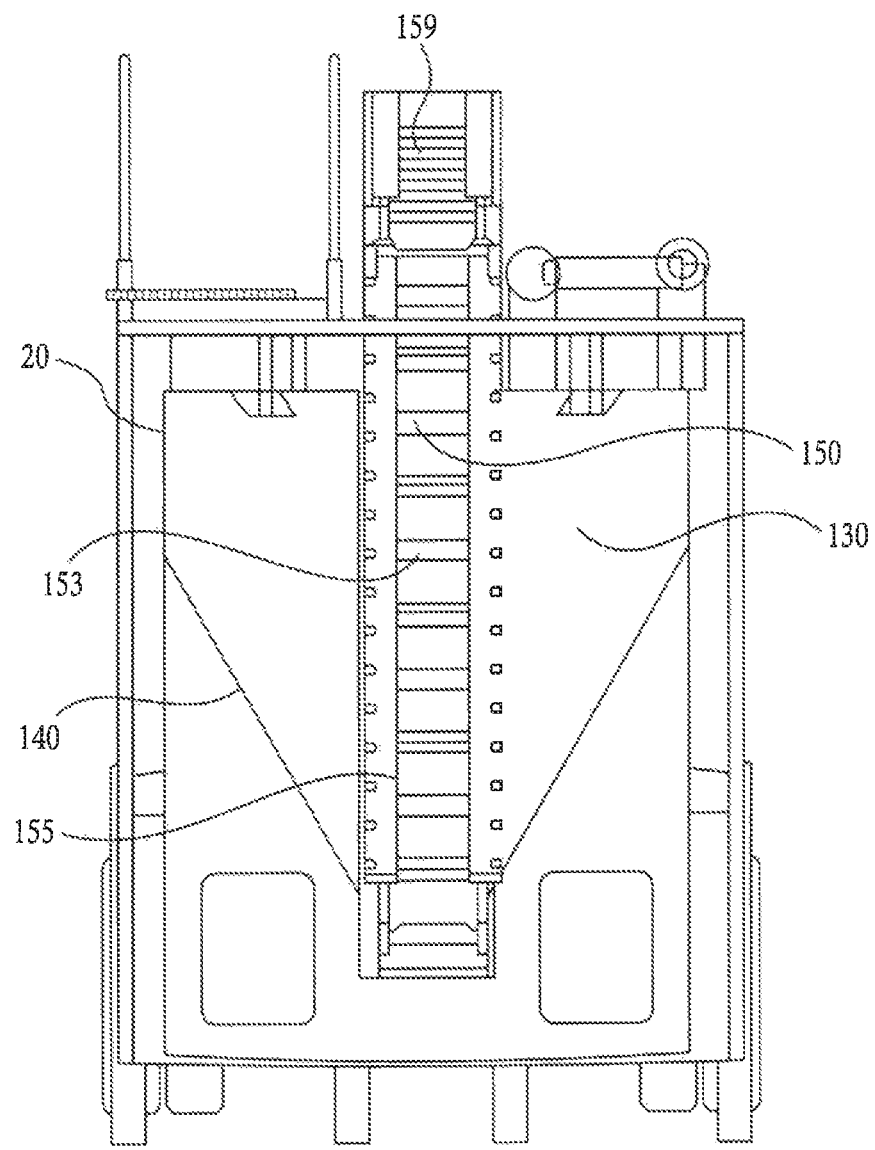
FIG. 6 is an enlarged view illustrating a hopper and drag chain assembly of the separation apparatus of FIGS. 1-4.

As shown in FIG. 6, hopper 20 may form a cavity 130 with an open top surface. Side walls 140 of hopper 20 may be angled inward, such that hopper 20 forms an inverted cone shape. Side walls 140 may be angled with a sufficient slope so that solids in the effluent fall to the bottom of hopper 20. In some embodiments, side walls 140 may be angled between 25 degrees and 35 degrees from the vertical, and more specifically about 30 degrees. If side walls 140 are angled less than 25 degrees, the solids within hopper 20 will not slide to a bottom portion of hopper 20. If side walls are angled greater than 35 degrees, hopper 20 will be of insufficient size to provide an effective retention time for finer particle separation. It is also contemplated that one or more side walls 140 may be angled at a different slope than one or more other side walls 140. In some embodiments, one or more side walls 140 of hopper 20 may be rounded. Additionally, hopper 20 may be formed of a material sufficient so that the solids in effluent will fall to the bottom of hopper 20.

Figure 2:
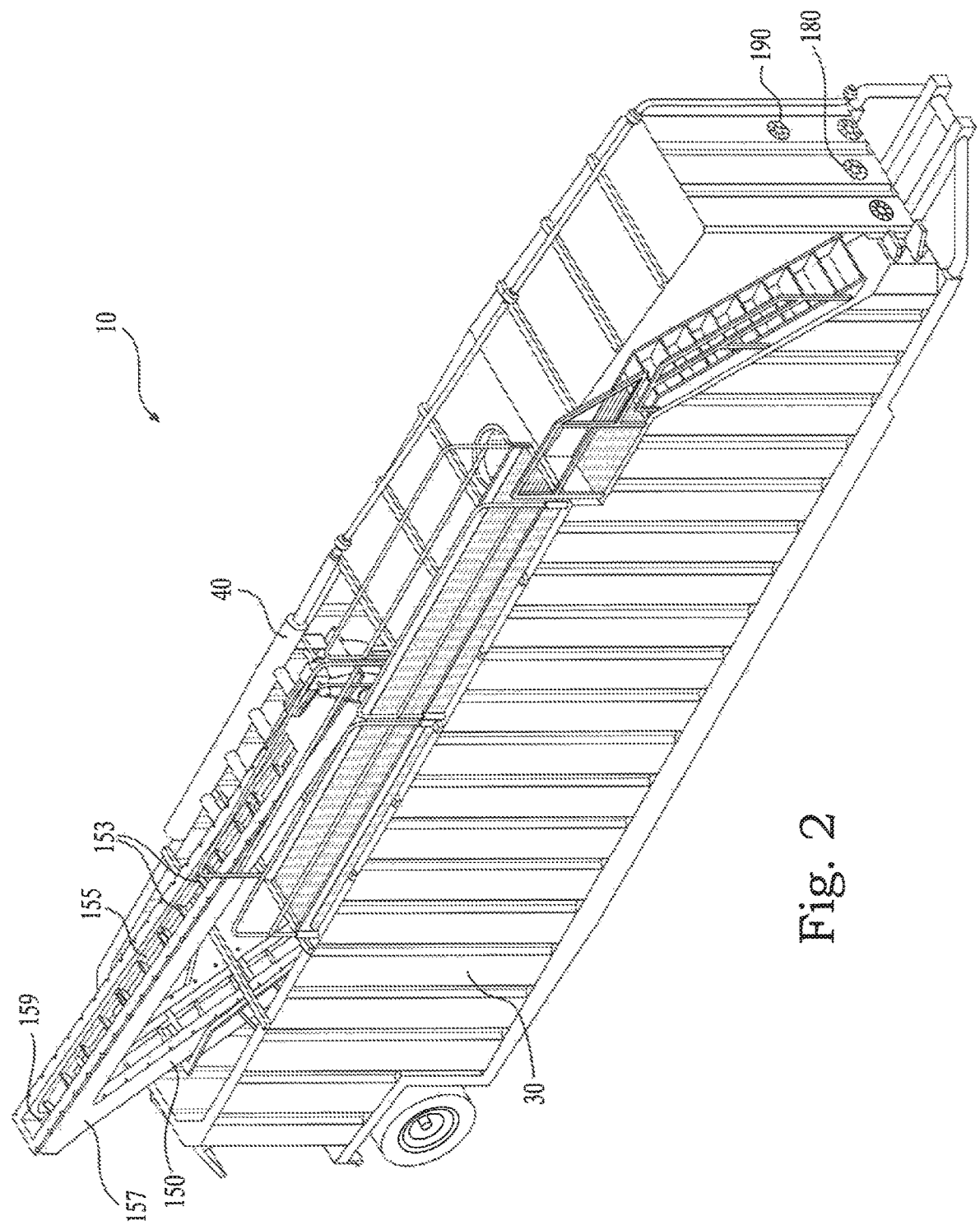
FIG. 2 is another diagrammatic illustration of an exemplary separation apparatus.
Figure 3:
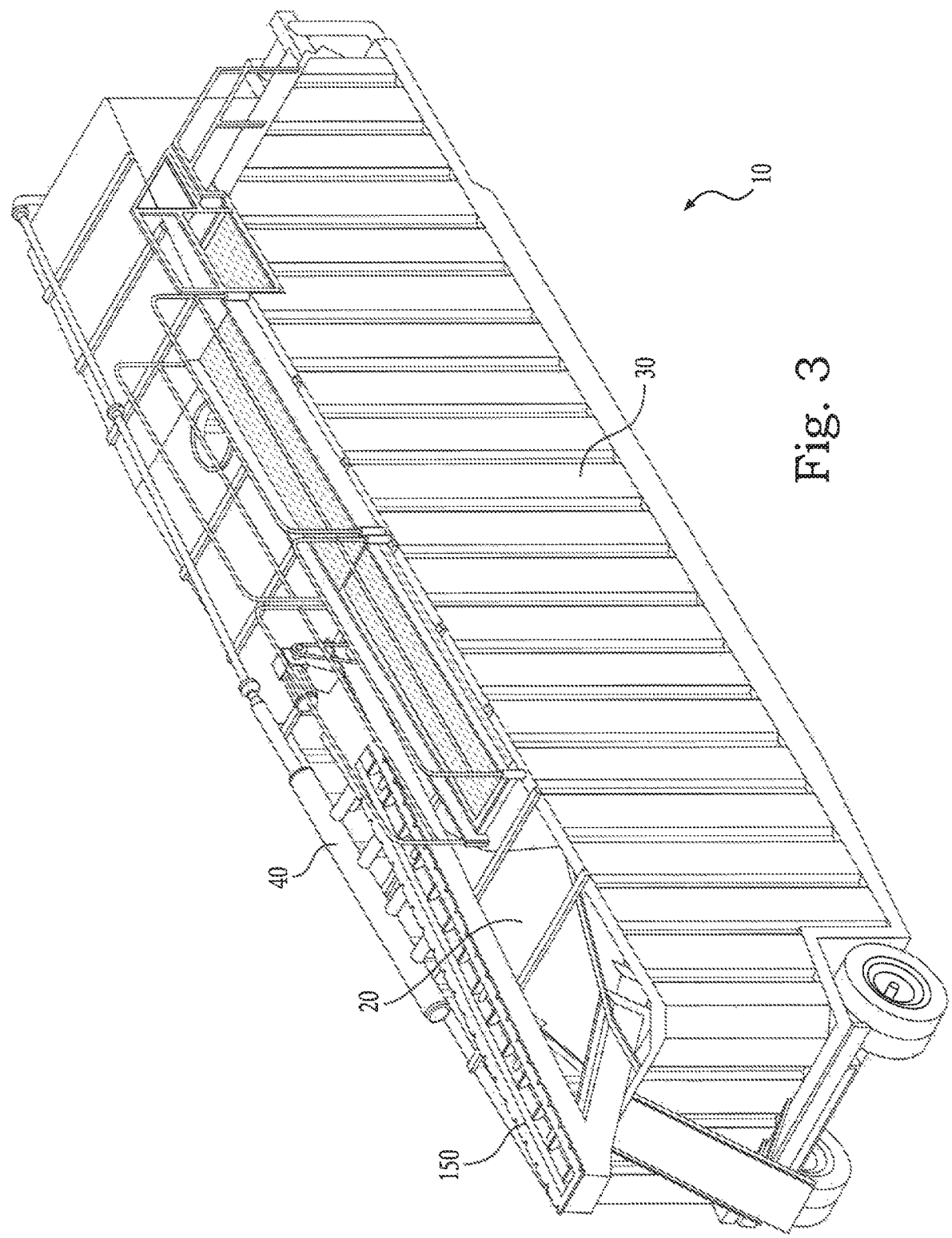
FIG. 3 is another diagrammatic illustration of an exemplary separation apparatus.
Figure 4:
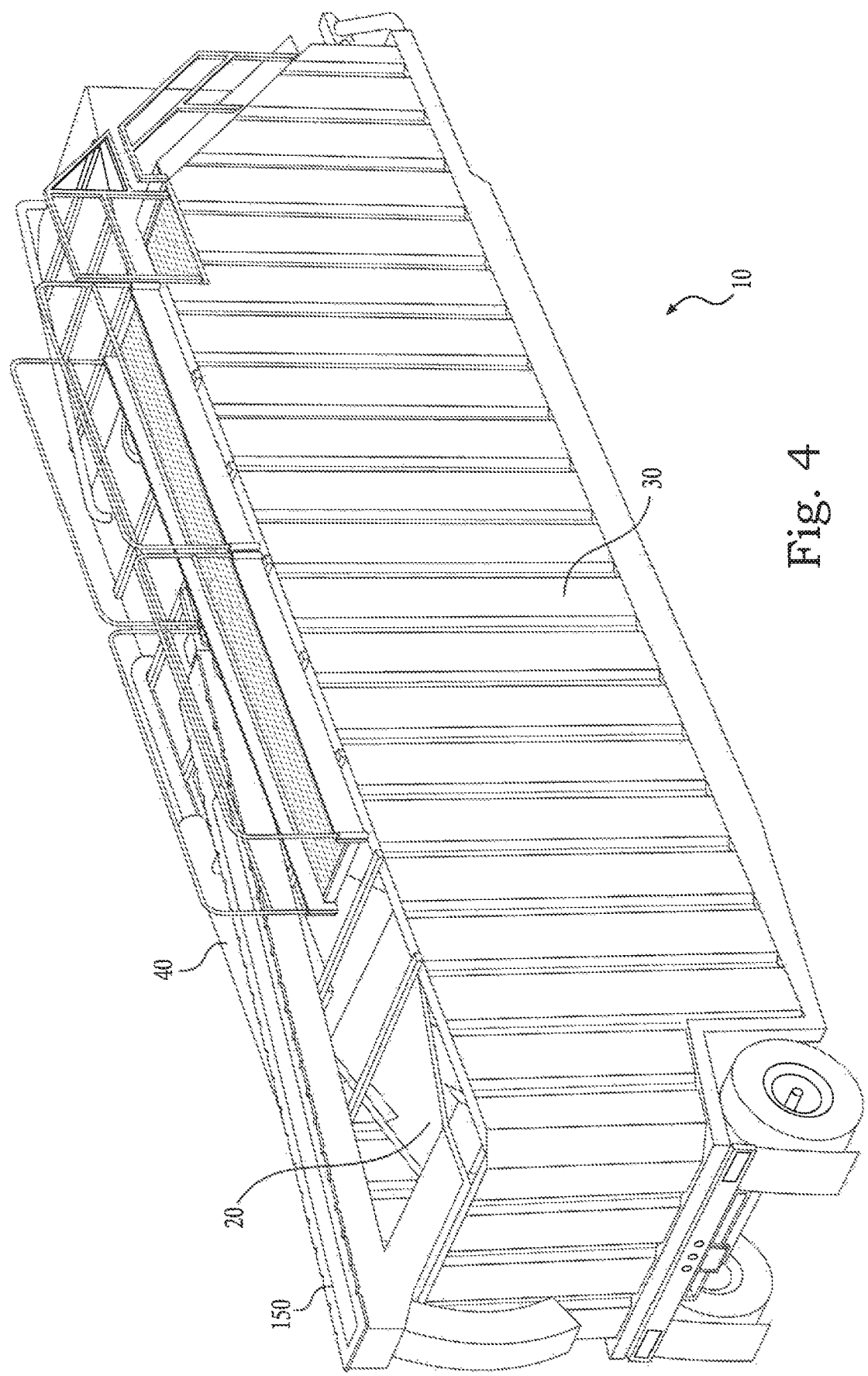
FIG. 4 is another diagrammatic illustration of an exemplary separation apparatus.

Hopper 20 may further include a drag chain assembly 150 to remove the solids from hopper 20. As shown in FIGS. 1-4 and 6, drag chain assembly 150 may include drag chain flights 153 disposed on a conveyor belt 155. Additionally, drag chain assembly 150 may include an outer housing 157. Conveyor belt 155 may move drag chain flights 153 continuously around the length of conveyor belt 155. Thus, as shown in FIGS. 1, 2, and 6, conveyor belt 155 may move drag chain flights 153 from a first position within hopper 20 to a second position outward of hopper 20.

Drag chain flights 153 may be of sufficient size in order to carry solids from hopper 20 so that drag chain assembly 150 removes the solids from hopper 20. Thus, drag chain assembly 150 prevents the build-up of solids within hopper 20. Drag chain assembly 150 may include a sufficient number of drag chain flights 153 to prevent the build-up of solids within hopper 20. In some embodiments, drag chain assembly 150 may include 20-100 drag chain flights 153. In some embodiments, drag chain assembly 150 includes about 30 drag chain flights 153. Furthermore, drag chain flights 153 may move at the speed of 40 ft per minute, and drag chain flights 153 may be 18 to 24 inches apart on drag chain assembly 150.

Conveyor belt 155 may continuously move while drag chain assembly 150 is in an on position. Thus, each drag chain flight 153 may move completely around the circumference of conveyor belt 155. Drag chain assembly 150 may operate so that drag chain assembly 155 moves at a speed sufficient to carry and remove the solids from hopper 20.

In some embodiments, drag chain flights 153 may pivot in order to pick up a larger amount of solids from hopper 20. Thus, when drag chain flights 153 are at or near the bottom portion of hopper 20, drag chain flights 153 may pivot in order to scoop up a larger amount of solids. It is further contemplated that all drag chain flights 153 pivot, or that only a portion of drag chain flights 153 pivot.

While drag chain flights 153 carry the solids away from hopper 20, the solids may be jet washed with water in order to clean the solids and remove any residual hydrocarbons in the solids. Additionally or alternatively, the solids may be washed with chemicals, such as detergent or dispersant.

Drag chain assembly 150 may be disposed partially within cavity 130 of hopper 20. Additionally, a portion of drag chain assembly 150 may be disposed over and above hopper 20. At least the portion of drag chain assembly 150 within cavity 130 may follow the inner surface of cavity 130. Thus, this portion of drag chain assembly 150 may follow the angle of side walls 140. This portion of drag chain assembly 150 may be angled between 10 degrees and 40 degrees from the vertical, and more specifically about 30 degrees.

As shown in FIGS. 1, 2, and 6, drag chain assembly 150 may include a solid discharge opening 159. Thus, the solids removed from hopper 20 on drag chain flights 153 may be moved off of drag chain assembly 150 through solid discharge opening 159. The solids may fall through solid discharge opening 159 and into an external apparatus, such as a shoot. Because the solids were jet washed and cleaned while on drag chain assembly 150, the solids may be reused again.

While the solids are removed from hopper 20, the liquid effluent (oil and water) remains in hopper 20 until it spills over into tank 30. Thus, as shown in FIG. 1, hopper 20 is directly attached to tank 30 so that the spill over liquids may flow directly from a top portion of hopper 20 and into tank 30.

Figure 7:
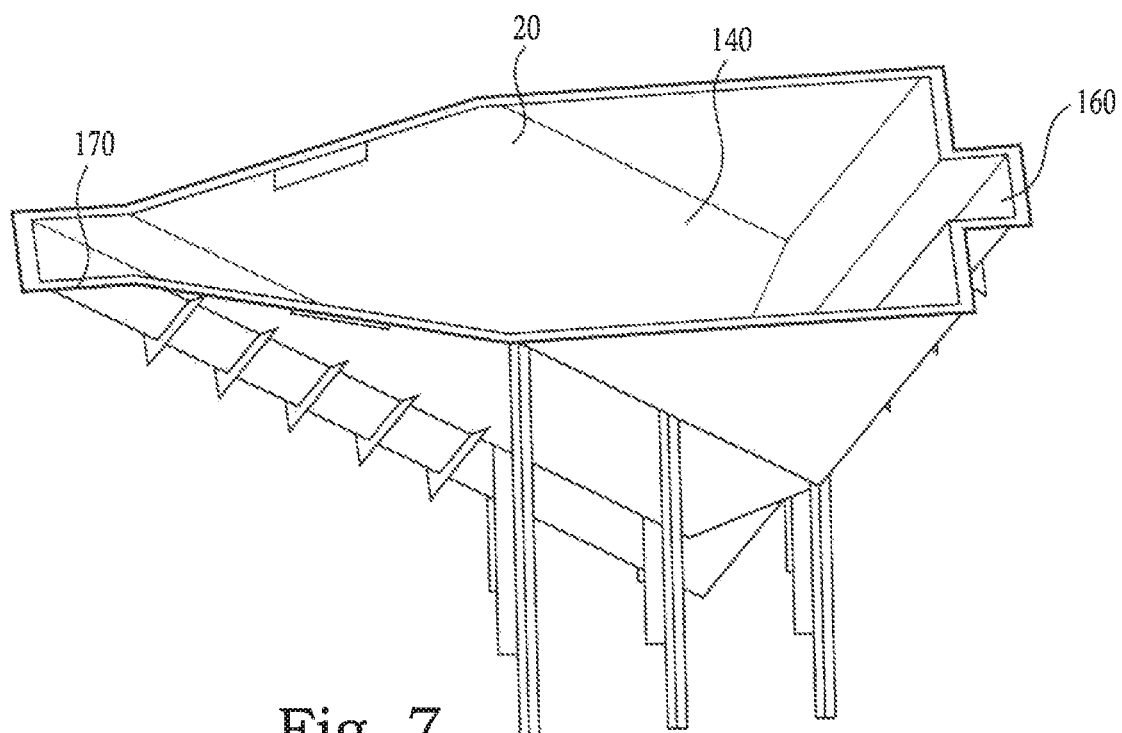
FIG. 7 is an enlarged view illustrating a hopper of the separation apparatus of FIGS. 1-4.
Figure 8:
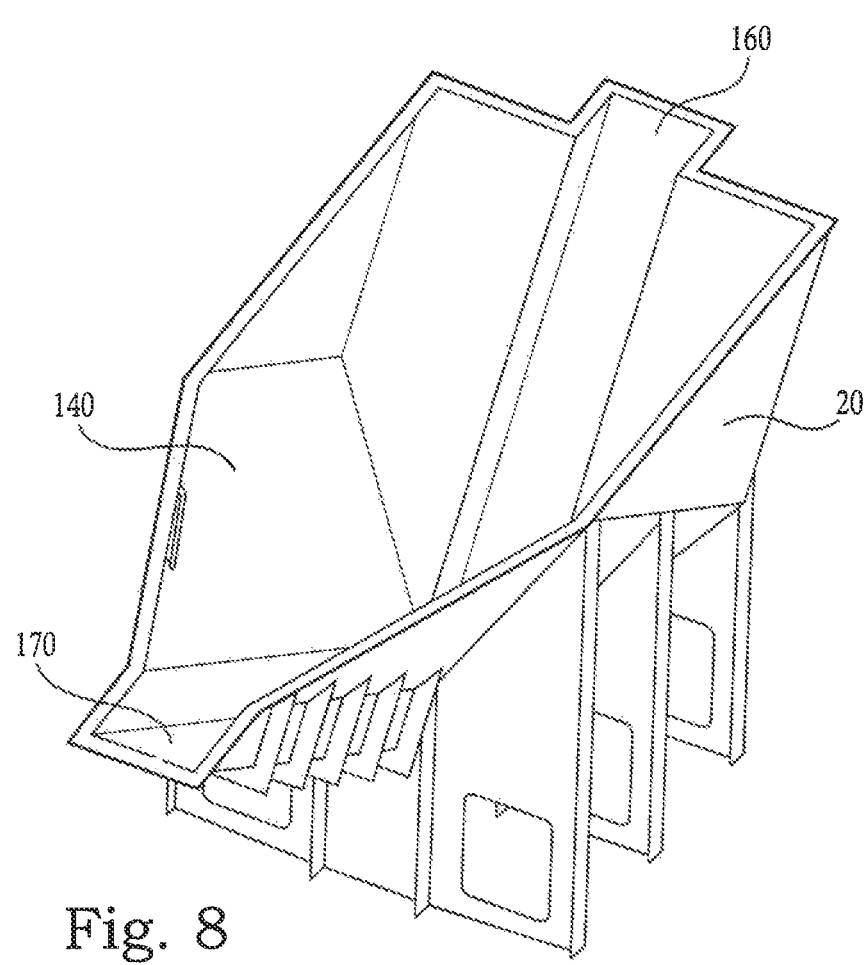
FIG. 8 is another enlarged view illustrating a hopper of the separation apparatus of FIGS. 1-4.

As shown in FIGS. 7 and 8, hopper 20 may include a spill over channel 160 for the liquid to move from hopper 20 and into tank 30. Thus, the liquid may spill over from a top portion of spill over channel 160 and into tank 30. Additionally, hopper 20 may include a drag chain channel 170 into which drag chain assembly 150 may be disposed. Drag chain channel 170 may be sized to securely fasten drag chain assembly 150 within hopper 20.

In use, liquids may be retained in hopper 20 for about 15 minutes before the liquid spills over, via spill over channel 160, into tank 30. The liquid may include a mixture of oil and water. Tank 30 may be configured to hold the liquid for a sufficient time for the oil and water in the liquid to separate. Additionally, tank 30 may include a port 180 to remove the water and a port 190 to remove the oil.

As an exemplary method of operation, effluent from a well first enters separation apparatus 10 through inlet inner tube 50. The effluent flows within inlet inner tube 50 and through holes 70, which reduce the speed of the effluent. Next, the effluent travels through cyclones 90 in intermediate tubes 80 and into diffuser shell 100. The solid and liquid portion of the effluent is then directed downward and into hopper 20 by baffles 113. The gas portion of the effluent diffuses into the atmosphere as the effluent moves from baffles 113 and into hopper 20.

The effluent is then dropped into hopper 20, which is already flooded with oil and water. The solids in the effluent fall downward to a bottom surface of hopper 20, while the liquid in the effluent spills over into tank 30. The solids are removed from the bottom of the hopper by drag chain assembly 150 such that drag chain flights 153 carry the solids out of the hopper 20. The solids are then removed from drag chain assembly 150 through solid discharge opening 159. Before the solids are removed from drag chain assembly 150, they may be jet washed for re-use.

The liquid in tank 30 is retained in tank 30 until the liquid separates into oil and water. The water is then removed through port 180 and the oil is removed through port 190.

Separation apparatus 10 provides a system and method to easily separate and clean sand for re-use in a fracking operation. Such advantageously lowers the cost to separate and clean the sand. Additionally, separation apparatus 10 provides a low cost system to separate the liquid effluent into oil and water. Separation apparatus 10 also provides for a safe release of gas from the effluent with minimal equipment.

Separation apparatus 10 may be used to clean sand recovered from well completion operations for reuse. It may be also be used to separate sludge, sand, and salt from ponds that are used to store waste water. Additionally, it may be used to separate sand from slurry that is recovered from dredgers.

What is claimed is:

1. A separation apparatus comprising:
a gas diffuser that includes an inlet inner tube for receiving effluent from a well;
a hopper that is disposed at least partially below the gas diffuser; and
a tank that is connected to the hopper,
wherein:
the gas diffuser is configured so that gas in the effluent is released from the effluent from the well and into an atmosphere before the effluent, from which the gas has been released, enters the hopper, and
the hopper is configured so that liquid effluent in the hopper spills over a top portion of the hopper and into the tank.

2. The separation apparatus according to claim 1, wherein the inlet inner tube includes a plurality of holes that are configured to reduce a speed of the effluent, from the well, as the effluent, from the well, moves through the plurality of holes.

3. The separation apparatus according to claim 1, wherein the inlet inner tube is connected to a diffuser shell that is disposed above a skirt, and the skirt includes one or more baffles that direct the effluent, from which the gas has been released, from the skirt and into the hopper.

4. The separation apparatus according to claim 3, wherein the skirt is disposed above the hopper such that a gap is formed between the skirt and the hopper.

5. The separation apparatus according to claim 1, wherein an outer tube is disposed radially outward of the inlet inner tube.

6. The separation apparatus according to claim 1, wherein the hopper includes a cavity to receive the effluent, from which the gas has been released, the cavity includes sidewalls that are angled inward.

7. The separation apparatus according to claim 6, wherein the sidewalls of the hopper are angled at about 30 degrees from a vertical direction.

8. The separation apparatus according to claim 1, further including a drag chain assembly that removes solid effluent from the hopper, the drag chain assembly including one or more drag chain flights and a conveyor belt.

9. The separation apparatus according to claim 8, wherein the drag chain assembly further includes a solid discharge opening for removing the solid effluent from the drag chain assembly.

10. The separation apparatus according to claim 8, wherein the hopper includes a drag chain channel that is sized to securely fasten the drag chain assembly within the hopper.

11. The separation apparatus according to claim 1, wherein the hopper includes a spill over channel so that the liquid effluent in the hopper spills over the top portion of the hopper and into the tank.

12. The separation apparatus according to claim 1, wherein the tank includes a first port to remove water and a second port to remove oil.

* * * * *